United States Patent
Duplain

(10) Patent No.: US 7,259,862 B2
(45) Date of Patent: Aug. 21, 2007

(54) LOW-COHERENCE INTERFEROMETRY OPTICAL SENSOR USING A SINGLE WEDGE POLARIZATION READOUT INTERFEROMETER

(75) Inventor: Gaétan Duplain, Beauport (CA)

(73) Assignee: Opsens Inc., Québec (CA)

( * ) Notice: Subject to any disclaimer, the term of this patent is extended or adjusted under 35 U.S.C. 154(b) by 332 days.

(21) Appl. No.: 10/976,863

(22) Filed: Nov. 1, 2004

(65) Prior Publication Data
US 2006/0061768 A1   Mar. 23, 2006

Related U.S. Application Data

(60) Provisional application No. 60/610,950, filed on Sep. 20, 2004.

(51) Int. Cl.
*G01B 9/02* (2006.01)
(52) U.S. Cl. ...................... 356/479; 356/491
(58) Field of Classification Search ............... 356/453, 356/479, 491, 497
See application file for complete search history.

(56) References Cited

U.S. PATENT DOCUMENTS 5,349,439 A * 9/1994 Graindorge et al. ........ 356/453
5,781,293 A * 7/1998 Padgett et al. .............. 356/453
6,519,040 B1 * 2/2003 Amos ......................... 356/453

OTHER PUBLICATIONS

Fiber-Optic "White-Light" birefringent temperature sensor, Mariller et al, SPIE vol. 798, 1987, pp. 121-130.*
Influence of dispersion on sensitivity of highly birefringent fibers to temperature and hydrostatic pressure, Urbanczyk et al, Applied Optics, May 1998, pp. 3176-3180.*
Thermal dependence of the principal refractive indices of lithium triborate, Tang et al, Journal of the Optical Society of America, Apr. 1995, pp. 638-643.*

* cited by examiner

*Primary Examiner*—Samuel A. Turner
(74) *Attorney, Agent, or Firm*—Ogilvy Renault, LLP

(57) ABSTRACT

The invention provides a method and a system for measuring a physical quantity by means of a tandem interferometer optical sensor system based on low-coherence interferometry. The system comprises a light system, a sensing interferometer and a polarization readout interferometer. The invention provides a polarization interferometer comprising a single birefringent wedge. The invention also provides for a dispersion-compensated optical sensor system. The invention also provides an interferometer sensitive to temperature that comprises a trajectory in a $L_iB_3O_5$ crystal with an x-cut orientation.

39 Claims, 9 Drawing Sheets

LOW-COHERENCE INTERFEROMETRY OPTICAL SENSOR USING A SINGLE WEDGE POLARIZATION READOUT INTERFEROMETER

CROSS-REFERENCE TO RELATED APPLICATIONS

This application claims priority under 35USC§120 of U.S. provisional patent application 60/610,950, filed on Sep. 20, 2004, the specification of which is hereby incorporated by reference.

FIELD OF THE INVENTION

This invention relates to an optical sensor based on low-coherence interferometry (LCI) for measuring a physical quantity. In particular, it relates to a LCI-based optical sensor based on the tandem interferometer arrangement with a polarization readout interferometer.

BACKGROUND OF THE ART

The interferometer is known as a very accurate optical measurement tool for measuring a physical quantity by means of the measurand-induced changes of the interferometer path length difference. When using a narrowband light source, the coherence length of the source is generally greater than the path length difference of the interferometer and therefore the measurement suffers from a $2\pi$ phase ambiguity, due to the periodic nature of the interferogram fringes, which may severally restricts the measuring applications. The $2\pi$ phase ambiguity problem is avoided by using a light source with short coherence length. In this case, the fringes of the interferogram are narrowly localized into a path length difference region so the variation of the path length difference can be determined without the $2\pi$ ambiguity by locating the fringe peak or the envelope peak of the interferogram. This type of interferometry is known as white-light or low-coherence interferometry (LCI).

Optical systems based on low-coherence interferometry have been widely studied and have been successfully developed in commercial applications such as the optical coherence tomography (OCT) and the low-coherence profilometry (LCP) which have become standard measurement tools. One gains two-dimensional cross-section image information using OCT or surface depth information using LCP by forming an interferometer between test and reference surfaces and by scanning the path length difference between them through a range of values. These optical measurement systems are mostly aimed to laboratory type or similar applications where environmental conditions are less of a concern.

Optical sensing systems based on LCI and aimed to industrial applications and to other non-laboratory type applications have also emerged as commercial products but they are still not standard measurement tools and there are just a few number of commercial suppliers. For these types of applications it is required that the sensing part of the measurement system must be significantly separated from the signal conditioning or readout part. In this case, the optical sensor based on LCI needs two interferometers usually connected with an optical fiber: 1) the sensing interferometer, which is subjected to the physical magnitude to be measured, and 2) the readout interferometer which is used to measure the measurand-induced changes of the path length difference of the sensing interferometer. This so-called tandem interferometer arrangement is generally more complex than that of the single interferometer configuration.

The optical sensors aimed at industrial applications and other non-laboratory type applications are likely to be exposed to severe environmental conditions. It is therefore important that the sensing interferometer must be designed to be sensitive to one type of measurand and to limit the spurious effects of other mesurands. It must also yield a constant and ideally linear relationship between the path length difference and the measurand. In the same manner, the readout interferometer must be very stable, that is, its internal calibration must remain valid for a long period of time. It must also provide a constant reading with a minimum dependence on environmental factors such as temperature, vibration, etc. These industrial "must-have" requirements adding to economic constraints prevented many optical sensing technologies developed in the laboratories from reaching the industrial sensor and other non-laboratory marketplaces.

A number of optical sensors for measuring a physical magnitude have been already proposed. U.S. Pat. No. 4,140,393 Cetas, February, 1979 and U.S. Pat. No. 4,598,996 Taniuchi, July, 1986 disclose the use of different birefringent crystals in a two-beam interferometer configuration as the sensing element for measuring temperature. They use crystals such as $LiTaO_3$, $LiNbO_3$, $BaTiO_3$ and $Sr_xBa_{1-x}Nb_2O_6$ to form a polarization sensing interferometer and they measure the light intensity at the output of the interferometer which varies sinusoidally due to temperature-induced changes of the crystal birefringence. Their optical sensing system is based on narrow-band light source so their measuring technique suffers from the $2\pi$ phase ambiguity and therefore offers a limited measurement range.

U.S. Pat. No. 5,255,068 Emo et al., October, 1993 uses similar crystals and sensing interferometer arrangement than Cetas and Tanaiuchi for measuring temperature but their optical sensing system benefits from the low coherence properties of the light source they use. However, the light source spectrum, modulated according to the temperature-dependent birefringence of the crystal, is recorded using a dispersive spectrometer which is known to have a lower optical throughput than an interferometer. Since the resulted signal is obtained in the frequency or wavelength domain rather than in the time or spatial domain, they use a Discrete Fourier Transform signal processing method which can be time consuming without mentioning the cost and complexity of using a dispersive spectrometer configuration. Moreover, the above-mentioned crystals are known to have a strong frequency-dependence of their birefringence which can severally reduce the accuracy of the Fourier transform signal-processing method.

Also known in the art, is the document by Bosselmann and Ulrich entitled "High-accuracy position-sensing with fiber-coupled white-light interferometers" published in OFS'84, Sep. 5-7, 1984 in which they describe the use of a Michelson interferometer as the readout interferometer in a LCI-based configuration. The path length difference of the Michelson interferometer is scanned by displacing one of its two mirrors and the fringes of the interferogram are recorded at the output of the interferometer using a single photodetector. The location of the fringe peak on the interferogram is determined from the measured values taken at different scanned positions of the movable mirror. Due to its movable optical parts, the mechanical stability is the weak point of this system without mentioning the problem of having to measure the position of the movable mirror with high precision.

U.S. Pat. No. 5,392,117 Belleville et al., February, 1995, U.S. Pat. No. 5,349,439 Graindorge et al., September, 1994 and the document by Duplain et al. "Absolute Fiber-Optic Linear Position and Displacement Sensor" published in OSA Technical Digest Series, Vol. 16, 1997 describe the use of a Fizeau interferometer for the measurement of the path length difference of a sensing interferometer. Their LCI-based optical sensing system consists of recording the fringes of the interferogram at the output of a Fizeau readout interferometer using a linear photodetector array and to locate the fringe peak position on the interferogram. The Fizeau interferometer, although it has no moving part, is made of an air-spaced wedge or a solid optical wedge which is not easy to produce as it requires the use of very complex thin film deposition methods or the use of optical component manufacture and assembly methods with severe thickness tolerances, optical alignment, material stability and optical quality. Moreover, the Fizeau interferometer, even tough it can be fabricated with a low finesse, still remains a multiple-beam interferometer in which case, the visibility of the fringes, when used in LCI configuration, is generally lower than that of a two-beam interferometer.

U.S. Pat. No. 4,814,604 and U.S. Pat. No. 4,867,565 issued to Lequime, as well as the document by Mariller and Lequime entitled "Fiber-Optic White-Light birefringent temperature sensor" published in SPIE Proceedings, Vol. 798, 1987, disclose the use of a LCI-based optical sensing device including a polarization sensing interferometer similar to the configuration disclosed in Cetas and Taniuchi patents. Their LCI-based optical sensing system consists of recording the fringe pattern at the output of a polarization readout interferometer using a linear photodetector array or a single photodetector. Their polarization readout interferometer is a rather complex assembly of different birefringent elements placed in between two polarizers. The birefringent elements comprise, at least, a crystal plate with two elementary birefringent prisms stuck together along a face so to form a Wollaston or a modified-Wollaston prism. These birefringent elements are mounted in variant forms of the Babinet compensator and the Soleil compensator. These types of configurations produce complex assembly devices and suffer from important drawbacks. In it simplest configuration, the plane of localization of the fringes is inside the Wollaston prism and is inclined to the exit face of the Wollaston prism. This situation requires correction optics to form an image of the fringes onto the surface of the photodetector. However, the inclination of the plane of localization produces a residual focusing error at the surface of the photodetector and therefore leads to a reduction in the fringe contrast unless the light source has a high degree of spatial coherence. To prevent this situation, Lequime proposes some modifications in their configuration by using a second Wollaston prism and an achromatic halfwave plate, but at the expense of increasing the complexity of the device.

Due to the high birefringence dispersion of the crystal used in their sensing interferometer (and possibly in the readout interferometer) the interferogram can be severally distorted therefore compromising the localization of the envelope peak or the fringe peak. They propose two solutions to overcome this problem. One solution consists to have their readout interferometer made of same birefringent material to that of the sensing interferometer. Such solution is likely to increase the sensitivity of the readout interferometer to environmental influences and therefore is not desired for industrial-based applications. Another solution proposed is to use a light source with narrower spectrum where the dispersion effect can be neglected but this solution comes to the expense of widening the path length difference region of the fringes which reduce the accuracy of the envelope peak or fringe peak location.

SUMMARY

The invention provides a simple and robust optical sensor system aimed at industrial and other applications and based on low-coherence interferometry using the tandem interferometer arrangement, for measuring a physical quantity such as, but not limited to, the temperature, the pressure, the strain, the displacement.

The present invention provides an optical sensor system comprising:

a sensing interferometer having its path length difference sensitive to the measured physical quantity, a light source such as, but no limited to, a filament light source or a LED light source and with coherence length smaller than the path length difference of the sensing interferometer, a static polarization readout interferometer, based on the two-beam interferometer configuration, having a spatially distributed path length difference variation along a direction, and comprising a wedge made of a birefringent crystal, preferably with low frequency dependence of its birefringence and with low temperature dependence of its birefringence, a linear polarizer placed in front of the birefringent wedge, that decompose unpolarized light into two orthogonal linear polarization components, a linear analyzer placed behind the birefringent wedge, with polarization axis oriented parallel or perpendicular to the polarization axis of the polarizer, that recombine the two orthogonal linear polarization components of the transmitted light at the output of the birefringent wedge so they can interfere, a set of optical fibers and an optical coupler that connect the sensing interferometer to the readout interferometer and to the light source, a photodetector array such as, but not limited to, a linear CCD-photodiode array for recording the spatially distributed interferogram at the output of the readout interferometer, a focusing optics to fed the transmitted or reflected light flux from the sensing interferometer through the readout interferometer and onto the surface of the photodetector device, and a signal processing unit for: 1) sampling the interferogram signal from the photodetector array, 2) noise suppression and signal correction; 3) determining the envelope peak location or the fringe peak location of the interferogram; 4) converting the envelope or fringe location into path length difference of the sensing interferometer and accordingly into the measurand value.

The invention also provides a scanning polarization readout interferometer with a single photodetector.

The invention also provides a temperature sensing interferometer made of temperature-sensitive birefringent material having similar birefringence dispersion than that of the birefringent wedge of the readout interferometer.

The invention also provides a tandem interferometer optical sensor system, based on low-coherence interferometry, for measuring a physical quantity. The system comprises a light system generating a light intensity characterized by a coherence length. The system also comprises a sensing interferometer, having a sensor path length difference larger than the coherence length, for receiving the light intensity and generating a sensor light signal as a function of the sensor path length difference, wherein the sensor path length difference is modifiable by a variation of the physical quantity. The system also comprises a polarization readout interferometer, having a readout path length difference and based on two-beam interferometer configuration, receiving the sensor light signal and generating, at an output location and as a function of the readout path length difference, a readout light signal, the polarization readout interferometer comprising an input polarizer for decomposing the sensor light signal into two linear orthogonal polarization components, a birefringent wedge in which are propagating at different speeds the polarization components, an output polarizer for recombining after propagation in the wedge the polarization components, and a focusing optic arrangement for relaying the received sensor light signal through the input polarizer, the birefringent wedge and the output polarizer and towards the output location, to thereby provide the readout light signal as a function of the readout path length difference.

Advantageously, the sensor path length difference of the tandem interferometer optical sensor system comprises a trajectory in a first birefringent material and the birefringent wedge is made of a second birefringent material, wherein the first and second birefringent materials have similar dispersion properties, to thereby provide a dispersion-compensated optical sensor system.

Advantageously, the readout path length difference of the polarization readout interferometer comprises a readout path length difference that varies spatially as a function of a readout axis, the readout light signal comprises a spatially distributed signal along the readout axis and the detection location is spatially distributed along the readout axis, to thereby provide a distributed interferogram at the detection location.

Advantageously, the tandem interferometer optical sensor system further comprises a linear photodetector array positioned at the detection location, for receiving the distributed interferogram and generating a corresponding photodetector signal as a function of the readout path length difference. The system also further comprises a signal processing unit for determining the physical quantity from the photodetector signal, thereby providing, with the aforementioned distributed interferogram and linear photodetector array, a static optical sensor system for the measurement of the physical quantity.

Advantageously, the tandem interferometer optical sensor system can be a scanning interferometer where the readout path length difference is varied as a function of time by scanning as a function of time and along the readout axis, a position of the birefringent wedge. The system may further comprises a single photodetector positioned at the detector location, for receiving the scanned readout light signal and generating a corresponding photodetector signal.

The invention also provides a method, based on low-coherence interferometry, for measuring a physical quantity. The method comprises providing a light system for generating a light intensity characterized by a coherence length. The method also comprises providing a sensing interferometer, having a sensor path length difference that is sensitive to the physical quantity such as to be modified by a variation of the physical quantity and that is larger than the coherence length. The method also comprises providing a polarization readout interferometer, having a readout path length difference and based on two-beam interferometer configuration, the polarization readout interferometer comprising an input polarizer for decomposing into two linear orthogonal polarization components a light, a birefringent wedge in which are propagating at different speed the polarization components, an output polarizer for recombining after propagation in the wedge the polarization components and a focusing optic arrangement. The method also comprises providing, at a detection location, a photodetector. The method also comprises relaying the light intensity from the light system into the sensing interferometer, wherein the sensing interferometer generates a sensor light signal as a function of its sensor path length difference. The method also comprises relaying the sensor light signal, using the focusing optic arrangement, through the input polarizer, the birefringent wedge and the output polarizer and towards the output location and generating, at the detection location by recombination of the polarization components, a readout light signal as a function of the readout path length difference. The method also comprises detecting, with the photodetector, the readout light signal and generating a corresponding photodetector signal as a function of the readout path length difference. Finally, the method comprises determining the physical quantity by analyzing the photodetector signal as a function of the readout path length difference.

Advantageously, the method further comprises providing a calibration database that relies the sensor path length difference to the physical quantity.

The invention also provides a sensing interferometer, sensitive to a temperature, the interferometer comprising a $LB_3O_5$ crystal with an x-cut orientation and a path length difference that comprises a trajectory in the $L_iB_3O_5$ crystal, whereby the path length difference is sensitive to the temperature such as to be modified by a variation of the temperature, to thereby provide a temperature-sensitive interferometer.

The invention also provides a polarization interferometer, having a path length difference, for providing, upon receiving an input light, an output signal. The polarization interferometer comprises an input polarizer for decomposing the input light into two linear orthogonal polarization components. The polarization interferometer comprises also a single birefringent wedge in which are propagating at different speeds the polarization components. The polarization interferometer comprises also an output polarizer for recombining, after propagation in the wedge, the polarization components and a focusing optic arrangement for relaying the input light through the input polarizer, the single birefringent wedge and the output polarizer and towards an output location, whereby the interferometer, upon receiving the input light, provides, at the output location, the output signal as a function of the path length difference.

Advantageously, the single birefringent wedge comprises a $MgF_2$ crystal.

DESCRIPTION OF THE DRAWINGS

In order that the invention may be readily understood, embodiments of the invention are illustrated by way of example in the accompanying drawings.

FIG. 9, curve (b), is a graph of the interferogram obtained with a polarization readout interferometer made of $MgF_2$ crystal wedge and with a polarization sensing interferometer based on $LiNbO_3$ crystal, in accordance with an embodiment of the present invention.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
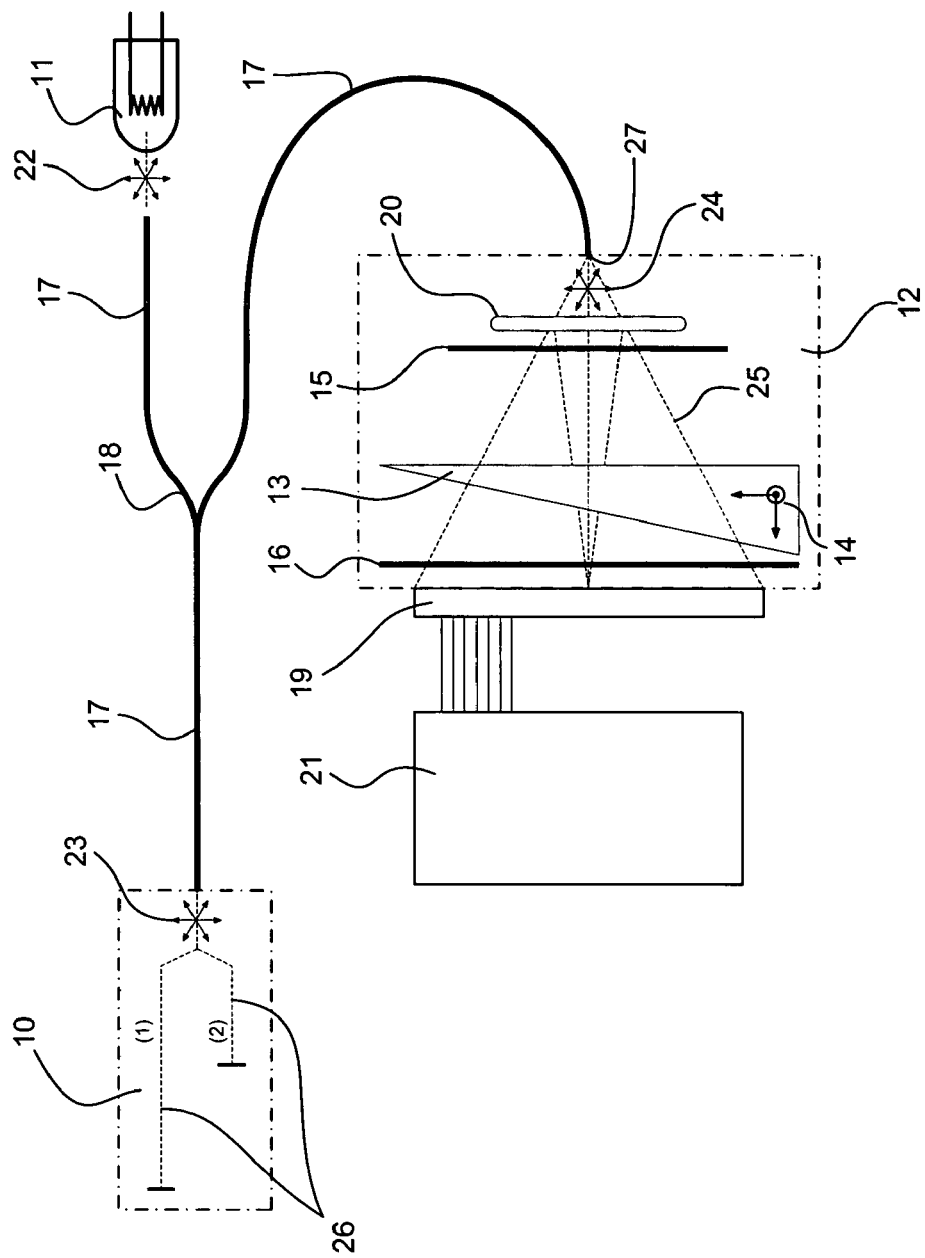
FIG. 1 is a schematic view of an optical sensor, in accordance with an embodiment, with a sensing interferometer operated in a reflection mode.

There are two basic configurations for the tandem interferometer optical sensor arrangement, which are the reflective and transmissive configurations. The optical sensor of the reflective configuration showed in FIG. 1 comprises a sensing interferometer 10 used in reflection mode and having its path length difference sensitive to the measured physical quantity. Preferably, the interferometer is a two-beam 26 interferometer, or a good approximation of this type of interferometer such as low finesse Fabry-Perot interferometer. A set of optical fibers 17 and an optical coupler 18 connect the sensing interferometer 10 to the light source 11 and to the readout interferometer 12. Light 22 emitted by the light source is sent, by means of the optical coupler 18 and the optical fibers 17, toward the sensing interferometer 10. Given a two-beam amplitude-division sensing interferometer 10 with equal losses in the two beams and assuming a stationary optical field with a high degree of spatial coherence at the input of the sensing interferometer, the power spectral density $I_s(\nu)$ at the output of the sensing interferometer is spectrally modulated in accordance with the spectral interference law and is given by the following equation:

$$I_s(\nu) = \quad (1)$$
$$K_s I_{in}(\nu)[1+\cos(2\pi\nu\tau_s(M)+\theta_s)] = K_s I_{in}(\nu)\left[1+\cos\left(2\pi\nu\frac{\delta_s(M)}{c}+\theta_s\right)\right]$$

where $\nu$ is the frequency of the light, $\tau_s$ and $\delta_s$ ($\delta_s = C\tau_s$) are respectively the relative time delay and the path length difference of the sensing interferometer 10 which vary as a function of the magnitude of the measurand M, c is the speed of light in vacuo, $I_{in}(\nu)$ is the power spectral density of the light flux at the input 23 of the sensing interferometer 10, $K_s$ and $\theta_s$ are numerical constants that depend on the type of sensing interferometer and its configuration (reflection or transmission mode).

The light at the output of the sensing interferometer 10 is collected by the same optical fiber 17 and is sent toward the readout interferometer 12. The light flux 24 exiting the optical fiber 17 is fed into the readout interferometer 12 using focusing optics 20. The readout interferometer 12 is a static polarization interferometer based on the two-beam interferometer configuration, having a spatially distributed path length difference variation along a direction, and comprising a single wedge 13 made of a birefringent crystal, having, in an embodiment, low frequency dependence of its birefringence and low temperature dependence of its birefringence; a linear polarizer 15 placed in front of the birefringent wedge 13, that decomposes unpolarized light into two orthogonal linear polarization components; and a linear analyzer 16 placed behind the birefringent wedge 13, with a polarization axis oriented parallel or perpendicular to the polarization axis of the polarizer 15, that recombines the two orthogonal linear polarization components of the transmitted light at the output of the birefringent wedge 13 so they can interfere. The light beam 25 goes through the readout interferometer and reaches the surface of the photodetector device 19. A signal processing unit 21 analyses the interferogram obtained from the light intensity distribution measured by the photodetector device 19 and determines the envelope peak location or the fringe peak location of the interferogram and converts this location into a path length difference of the sensing interferometer 10 and accordingly into the measurand value.

Figure 2:
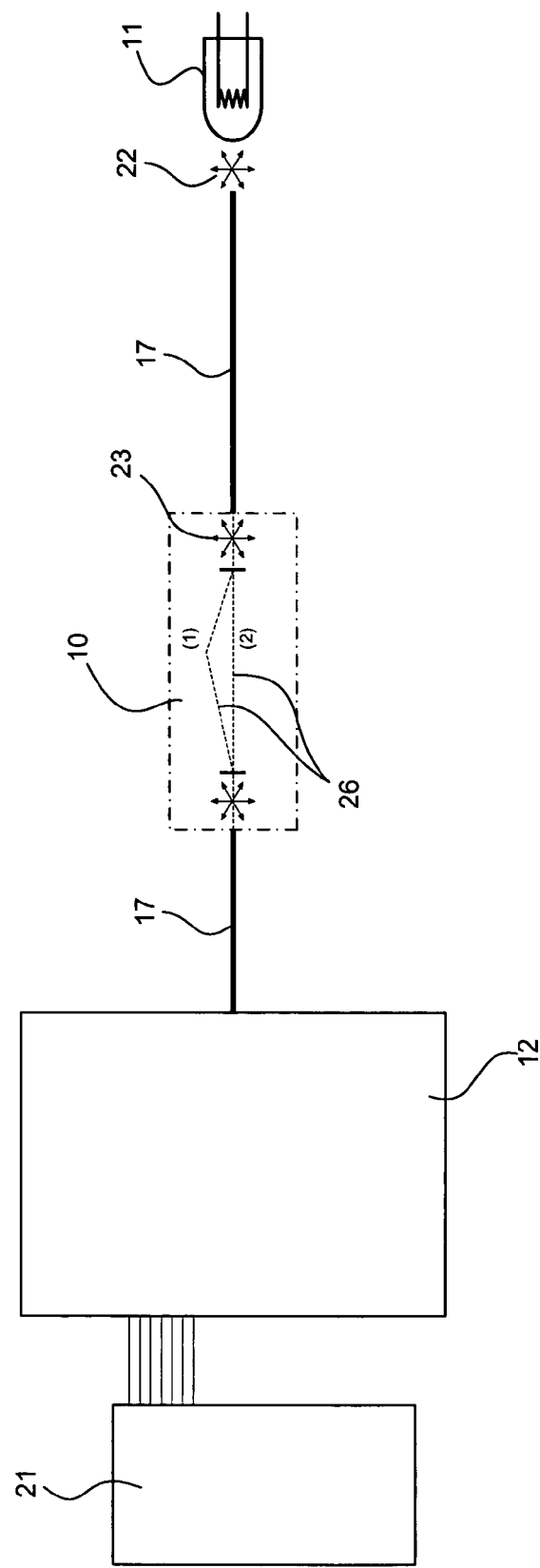
FIG. 2 is a schematic view of an optical sensor, in accordance with the embodiment of FIG. 1, with a sensing interferometer operated in a transmission mode.

FIG. 2 depicts the optical sensor transmissive configuration. It comprises a sensing interferometer 10 used in transmission mode and having its path length difference sensitive to the measured physical quantity. In an embodiment, the interferometer is a two-beam 26 interferometer, or a good approximation of this type of interferometer such as low finesse Fabry-Perot interferometer. A set of optical fibers 17 connect the sensing interferometer 10 to the light source 11 and to the readout interferometer 12. Equation (1) holds as well for this type of configuration. Different variants of the reflective and transmissive configurations exist and are not given here as they are evident for those skilled in the art.

Figure 3:
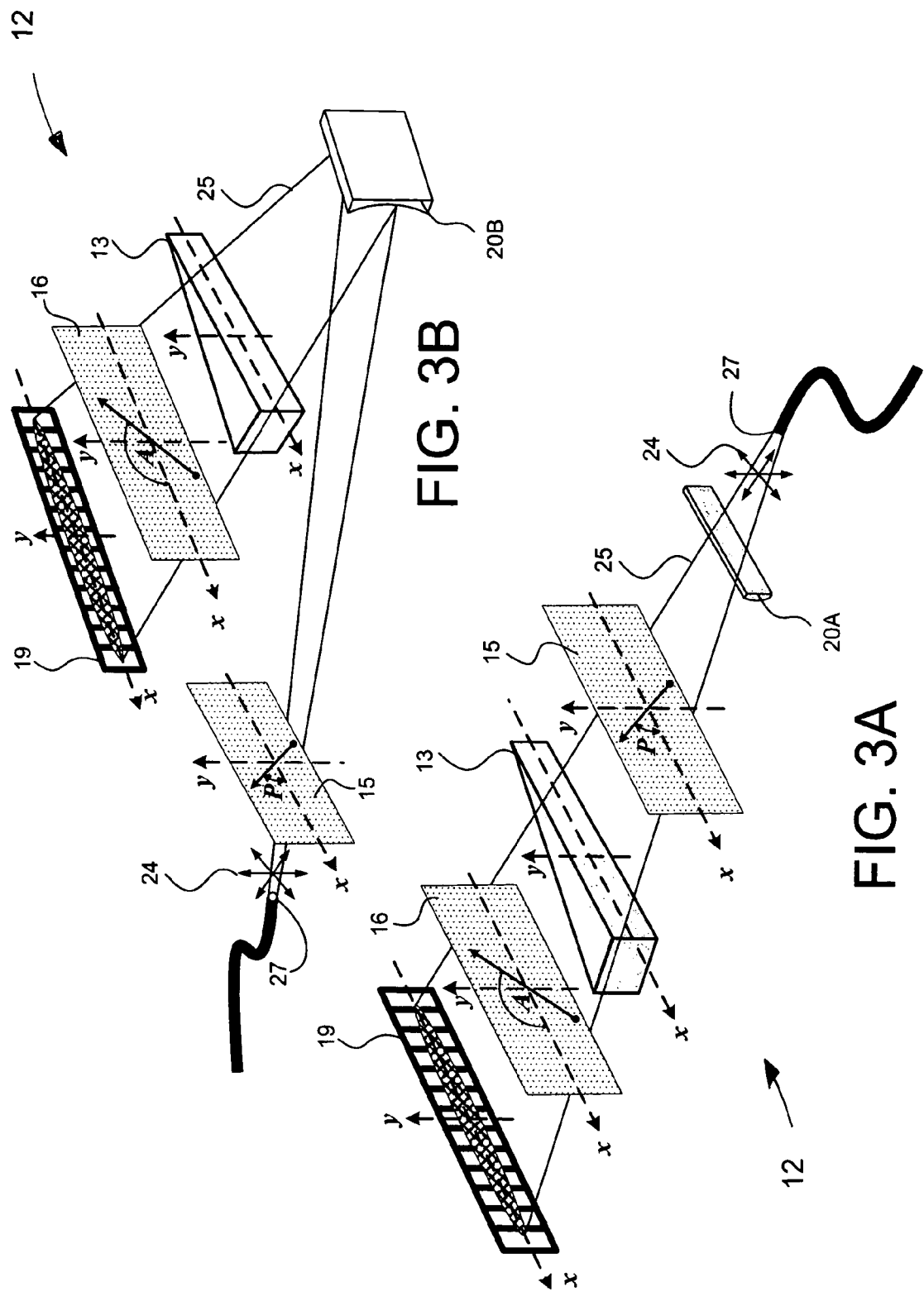
FIG. 3A is a schematic view of a readout interferometer of the optical sensor of FIG. 1 or of FIG. 2, with a cylindrical lens.
FIG. 3B is a schematic view of a readout interferometer of the optical sensor of FIG. 1 or of FIG. 2, with a cylindrical mirror.

An embodiment of the focusing optics of the readout interferometer 12 is illustrated in FIG. 3A and FIG. 3B. The focusing optics 20 is a simple anamorphic imaging system made of a single cylindrical lens 20A or a cylindrical mirror 20B. It projects an image of the exit face 27 of the optical fiber onto the surface of the photodetector array but in the vertical direction only (y direction on the figure). In the other direction, the light beam is spread over the length of the array by making use of the divergence of the light beam that exit the optical fiber. It is preferable to have the birefringent wedge 13, the linear analyzer 16 and the photodetector device 19 close to each other but further away from the input optical fiber (not explicitly shown on FIGS. 3A and 3B). Under this condition and by limiting the angle of the birefringent wedge to small values (as it will be discussed subsequently), the splitting of the light beam at the photodetector surface and due to double refraction in the birefringent wedge is kept very small and does not significantly reduces the visibility of the fringes. Another advantage of this configuration is that the size of the light beam at the input of the readout interferometer 12 is rather small compared to its distance from the birefringent wedge 13 so the input light beam can be seen as a good approximation of a point source, at least in the x direction. It is well know from the theory of interference that the fringes are not localized with a point source and therefore the visibility of the fringes is not affected by the double refraction effect in the wedge. For those skilled in the art, it is obvious that there are pluralities of different anamorphic imaging systems different than the two described here which can be used in the readout interferometer 12.

Figure 4:
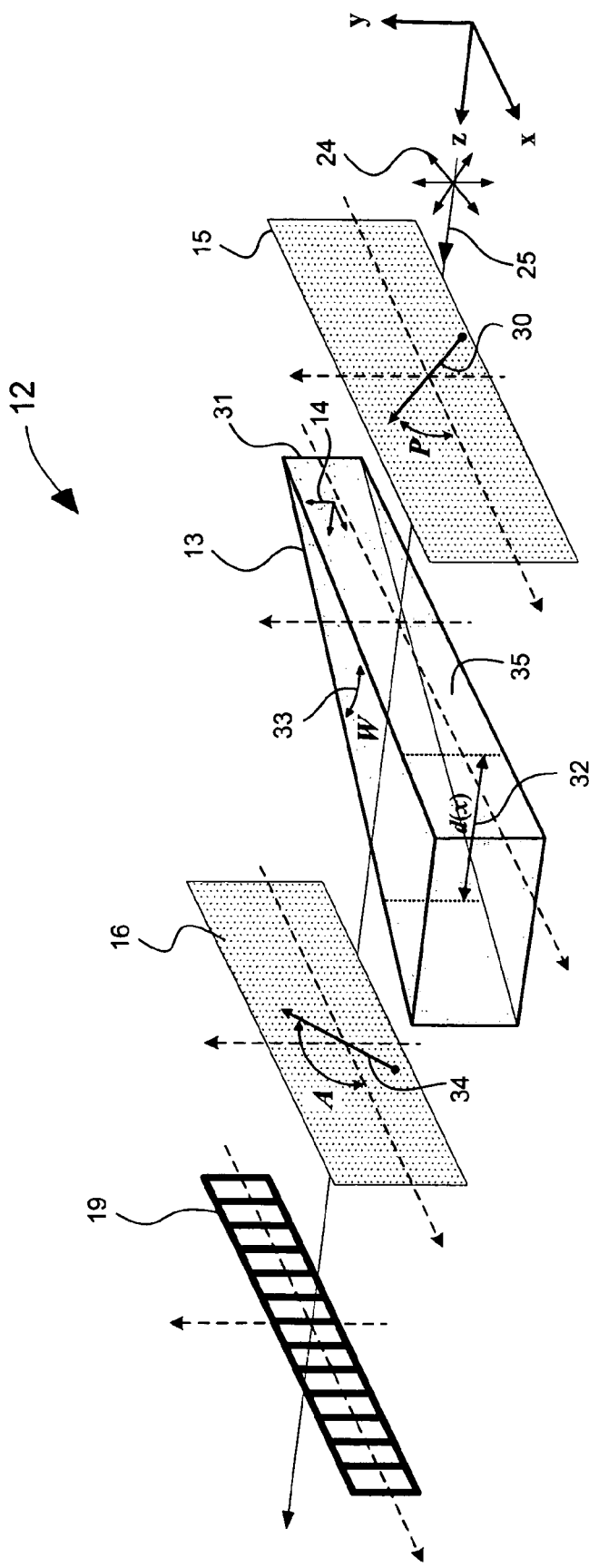
FIG. 4 is a partial schematic view of the readout interferometer of the optical sensor of FIG. 1 or of FIG. 2.

FIG. 4 shows a diagram of an embodiment of the readout interferometer 12. For ease of comprehension, the wedge is orientated such that its first surface lies parallel to the x-y plane and its edge lies parallel to the y axis of the figure. The thickness d(x) of the wedge 32 varies as a linear function of the position on the x axis as follows:

$$d(x)=x\tan(W)+d_0 \quad (2)$$

where W is the wedge angle 33 and $d_0$ is the thickness of the wedge at the position x=0. The wedge 13 is made of a crystal which exhibits optical anisotropy; that is, the velocity of the light through the crystal depends upon the direction of propagation and the direction of vibration. In an embodiment, the crystal of the wedge has one of its principal sections parallel to the front surface of the wedge 35 and has one of the principal vibrating axes 14 of that principal section perpendicular to the edge 31 of the wedge 13. With such orientation, the principal vibrating axes and hence the principal indices of the birefringent crystal correspond to the x, y and z axes of FIG. 4. The wedge 13 is preferably made of a uniaxial crystal with principal refractive indices $n_e$ and $n_o$. Without loss of generality, the refractive indices in the x and y direction are arbitrarily selected as $n_x \equiv n_e$ and $n_y = n_s \equiv n_o$, so the birefringence of the crystal is $B \equiv (n_e - n_o) = (n_x - n_y)$.

The linear polarizer 15 has its transmission axis 30 preferably orientated at an angle P=±45 degrees with respect to the aforementioned principal vibrating axis which correspond to the x axis of the figure. The linear analyzer 16 has its transmission axis 34 preferably orientated parallel or perpendicular to the transmission axis 30 of the polarizer 15, so its orientation angle is preferably A=P or A=P±90 degrees.

Light flux 24 received from the sensing interferometer 10 is fed into the readout interferometer 12 and is linearly polarized at angle P with respect to x axis. Once entering the front face of the birefringent wedge, the linearly polarized light decomposes into x and y orthogonal polarization components that propagate with different phase velocities due to difference in refractive indices $n_e$ and $n_o$. Considering only normally incident light, the path length difference $\delta_r$ and accordingly the relative time delay $\tau_r$ between the two orthogonal x and y components at the back surface of the wedge is given by the following equation:

$$\delta_r = c\tau_r = Bd(x) = (n_e - n_o)[x\tan(W)+d_0] \quad (3)$$

which shows the linear dependence of $\delta_r$ (and $\tau_r$) with the position x. One can appreciate the fact that given a wedge thickness error $\Delta d$ due to the inherent limitations in the optical manufacturing tolerances, the corresponding relative path length difference error $\Delta\delta$ is equal to B $\Delta d$, while that of a Fizeau interferometer is equal to 2 $\Delta d$. In practice it means that, given an acceptable limit of the path length difference error, the imposed thickness tolerance limit for the birefringent wedge is about two orders of magnitude larger than that of the wedge of a Fizeau interferometer. Therefore, the birefringent wedge is much easier to produce than the Fizeau wedge. The same is true if we compare the manufacturing tolerance of the birefringent wedge angle to that of the Fizeau wedge.

Figure 5:
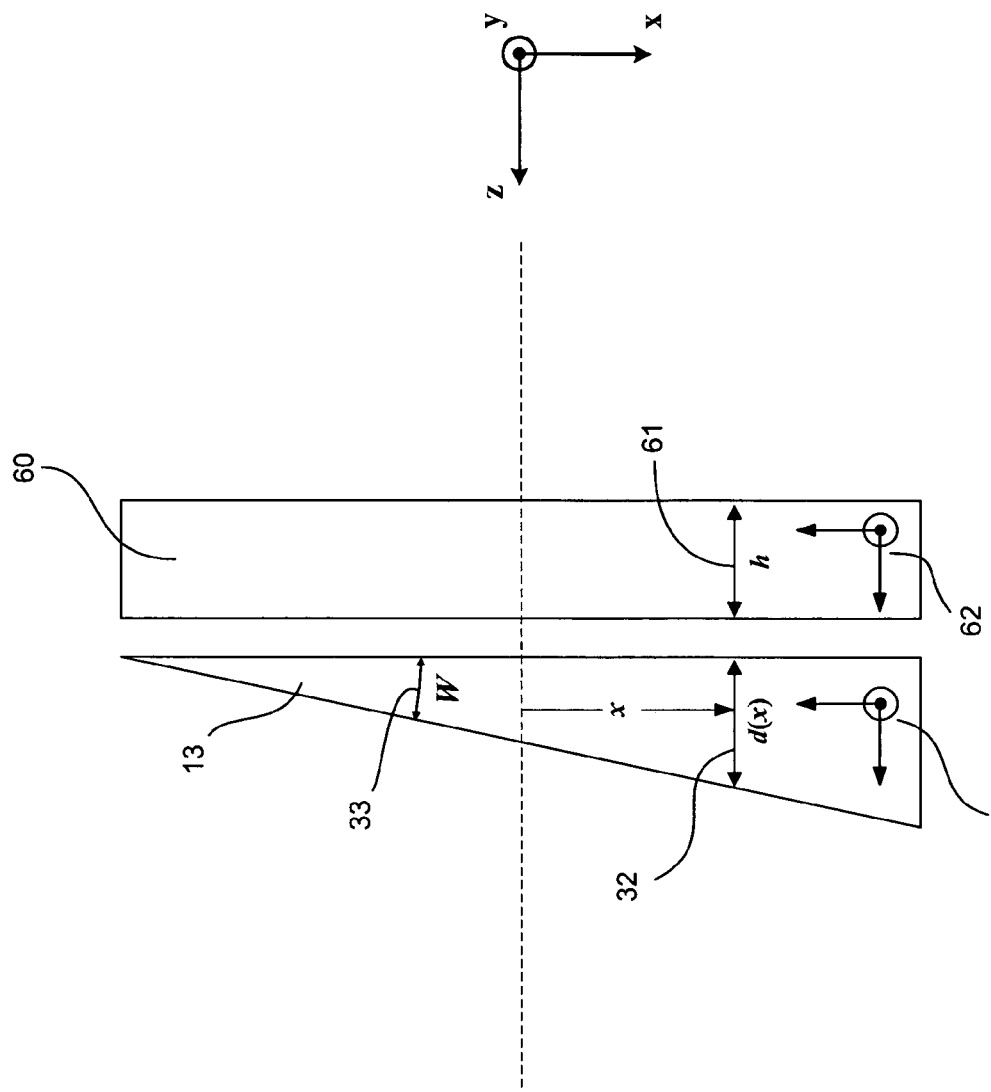
FIG. 5 is a partial schematic view of a readout interferometer in accordance with an alternate embodiment.

FIG. 5 shows another embodiment for the birefringent wedge. A birefringent plate 60 of thickness 61 h, preferably made of the same crystal material as the wedge 13, is positioned in front or behind the birefringent wedge 13. This birefringent plate 60 is used to increase or decrease the midpoint of the path length difference operating range of the readout interferometer. The crystal of the plate is orientated to have two of its three principal vibrating axes 62 parallel to the surface of the plate. In the case where the plate 60 is made of a uniaxial crystal, its x and y principal vibrating axes, as previously defined are parallel to the surface of the plate and their orientation in that plane may be adjusted to two positions: one at same orientation and one at crossed orientation with respect to the crystal principal vibrating axes of the birefringent wedge 13. In the case where the plate 60 and the wedge 13 are made of the same uniaxial crystal, the path length difference of the readout interferometer is:

$$\delta_r = c\tau_r = \quad (4)$$
$$\begin{cases} B(d(x)+h) = (n_e - n_0)[x\tan(W)+(d_0+h)] & \text{for parallel orientation} \\ B(d(x)-h) = (n_e - n_0)[x\tan(W)+(d_0-h)] & \text{for crossed orientation} \end{cases}$$

The above equation shows that adding a birefringent plate of thickness h provide a simples means to increase or decrease the midpoint of the path length difference operating range without having to use a different wedge. The birefringent plate 60 may be bonded directly to the birefringent wedge 13 or it may be separated from it so it can be easily removed or changed.

The choice of the wedge birefringent crystal is very important and is based on the optimum combination of three properties of the crystal: the magnitude of the birefringence, the dispersion or the frequency dependence of the birefringence, and the temperature dependence of the crystal properties. Given a range of path length difference suitable for the sensing application, the birefringence B of the crystal must be sufficiently large otherwise the birefringent wedge would make a bulky component with a large wedge angle. On the other hand, the dispersion of the birefringence must remains small as it may severally distort the interferogram. The distortion depends mainly upon the magnitude of the second wavelength derivative of the birefringence $\partial^2 B/\partial\lambda^2$. It is obvious that the temperature dependence $\partial\delta_r/\partial T$ of the path length difference of the wedge must be small as well. Equation (3) shows that $\partial\delta_r/\partial T$ depends on the temperature dependence $\partial B/\partial T$ of the birefringence and on the temperature dependence $\partial d/\partial T$ of the thickness of the wedge. We can define a normalized temperature coefficient $\chi$ for the temperature dependence of the path length difference as following:

$$\chi \equiv \frac{1}{\delta_r}\frac{\partial\delta_r}{\partial T} = \left(\frac{1}{B}\frac{\partial B}{\partial T}+\alpha\right) \quad (5)$$

where $\alpha$ is the coefficient of thermal expansion (1/d $\partial d/\partial T$) of the crystal in the direction perpendicular to the x-y plane of the FIG. 4. We found that Magnesium fluoride ($MgF_2$) and Quartz ($SiO_2$) crystals are preferred crystals the former being the preferred one. Table 1 gives the main properties of these two crystals with, for comparison, the properties of Lithium Niobate (LiNbO$_3$) crystal which has been used in the prior art (properties given at room temperature and at 800 nm wavelength region).

TABLE 1

| Crystal | B | $\partial^2 B/\partial \lambda^2$ | $\chi$ |
|---|---|---|---|
| MgF$_2$ | 0.012 | $1.1 \times 10^{-9}/\text{nm}^2$ | $-4.7 \times 10^{-5}/°$ C. |
| SiO$_2$ | 0.009 | $2.1 \times 10^{-9}/\text{nm}^2$ | $-12.7 \times 10^{-5}/°$ C. |
| LiNbO$_3$ | $-0.079$ | $-66.6 \times 10^{-9}/\text{nm}^2$ | $-51.3 \times 10^{-5}/°$ C. |
| LiB$_3$O$_5$ (x-cut) | 0.014 | $1.3 \times 10^{-9}/\text{nm}^2$ | $-45.5 \times 10^{-5}/°$ C. |

Although LiNbO$_3$ has a higher birefringence than MgF$_2$ and SiO$_2$, the temperature and wavelength dependence of its birefringence is rather high and therefore a readout interferometer designed with this crystal would come with severe drawbacks. (The LiB$_3$O$_5$ (x-cut) crystal is discussed in a subsequent section).

Given a readout interferometer made with a MgF$_2$ birefringent wedge 13 with a path length difference range of about 40 000 nm, which is in practice suitable for most of the applications, and using a photodetector array of 25 mm length, we obtain a wedge angle of about 7 degrees. Such angle produces a rather small light beam splitting (less than 4 micrometers) due to double refraction at the output of the birefringent wedge 13 and therefore does not significantly reduce the visibility of the interferogram fringes.

Assuming that the coherence length of the light source is much smaller than the path length difference of the sensing interferometer 12 and with the aforementioned point source approximation, the interference pattern (referred to as an interferogram) recorded by the photodetector array at the output of the readout interferometer representing the light intensity distribution $I_r(\delta_r)$ versus the path length difference $\delta_r$, can be expressed by the following formula derived from the general interference law for stationary optical fields (see L. Mandel and E. Wolf, Optical coherence and quantum optics, Cambridge University Press, 1995, pages 159-170):

$$I(\delta_r) = K_s K_r I_o \left[ 1 + \cos(\theta_r) \text{Re}\{\gamma_{11}(\delta_r)\} + \frac{1}{2}\cos(\theta_r - \theta_s)\text{Re}\{\gamma_{12}(\delta_r - \delta_s)\} \right] \quad (6)$$

where $\gamma_{11}$ is the complex degree of self coherence of the light vibrations at the readout interferometer and $\gamma_{12}$ is the complex degree of mutual coherence of the light vibrations at the readout and the sensing interferometer, Re{ } denotes the real part of the complex quantity $\gamma$, $I_o$ is the total intensity of the effective light source defined hereinafter. $K_s$, $K_r$ and $\theta_s$, $\theta_r$ are numerical constants that depend on the sensing and readout interferometer configuration respectively. With the use of the following general forms for $\gamma$:

$$\gamma_{11}(\delta_r) \equiv |\gamma_{11}(\delta_r)| \exp\left(i\left[\alpha_{11}(\delta_r) - 2\pi v_o \frac{\delta_r}{c}\right]\right), \quad (7)$$

$$\gamma_{12}(\delta_r - \delta_s) \equiv |\gamma_{12}(\delta_r - \delta_s)| \exp\left(i\left[\alpha_{12}(\delta_r - \delta_s) - 2\pi v_o \left(\frac{\delta_r - \delta_s}{c}\right)\right]\right)$$

$$\alpha_{11}(\delta_r) = 2\pi v_o \frac{\delta_r}{c} + \arg\{\gamma_{11}\},$$

$$\alpha_{12}(\delta_r - \delta_s) = 2\pi v_o \left(\frac{\delta_r - \delta_s}{c}\right) + \arg\{\gamma_{12}\}$$

where $v_o$ is the mean frequency of the effective light source, | | denotes the complex modulus and arg{ } the complex argument of the complex value $\gamma$, the interferogram can be expressed in the following form:

$$I_r(\delta_r) = K_s K_r I_o \left[ 1 + \cos(\theta_r)|\gamma_{11}(\delta_r)|\cos\left[2\pi v_o \frac{\delta_r}{c} - \alpha_{11}(\delta_r)\right] + \frac{1}{2}\cos(\theta_r - \theta_s)|\gamma_{12}(\delta_r - \delta_s)|\cos\left[2\pi v_o\left(\frac{\delta_r - \delta_s}{c}\right) - \alpha_{12}(\delta_r - \delta_s)\right] \right] \quad (8)$$

Equation (8) shows that the fringes of the interferogram at the output of the readout interferometer 12 are the sum of two amplitude-modulated fringe signals. These two fringe signals have a cosine carrier of frequency $v_o$, a phase function a and an envelope function |$\gamma$|. The envelope function is often called the visibility envelope function or the coherence envelope function which is a measure of the fringe visibility of the interferogram.

According to the Wiener-Khintchine theorem we have:

$$\gamma_{11}(\delta_r) = \int_{-\infty}^{\infty} P(v) e^{-i2\pi v \frac{\delta_r}{c}} dv, \quad (9)$$

$$\gamma_{12}(\delta_r - \delta_s) = \int_{-\infty}^{\infty} P(v) e^{-i2\pi v \left(\frac{\delta_r - \delta_s}{c}\right)} dv \text{ where}$$

$$P(v) = \frac{I_{\text{eff}}(v)}{I_o} \quad (10)$$

is the normalized power spectral density of the effective light source and $$I_o = \int_0^{\infty} I_{\text{eff}}(v) dv \quad (11)$$

is the total intensity of the effective light source. The later is defined by the effective spectral density $I_{\text{eff}}(v)$ of the light source which includes the wavelength dependence of the photodetector sensitivity and the wavelength dependence of the transmission losses and reflection losses of the optical sensor components. Equation (9) shows that the complex degree of self coherence $\gamma_{11}$ or the complex degree of mutual coherence $\gamma_{12}$ and the normalized power spectral density of the effective light source P(v) form a Fourier transform pair. Therefore, the envelope and the phase of the interferogram fringes depend upon the spectrum of the light source. In practice we observe that $\alpha$ and |$\gamma$| are slowly varying functions of the path length difference compared with the cosine carrier. If P(v) is assumed to be Gaussian shaped given by:

$$P(v - v_o) = \frac{2\sqrt{\ln 2}}{\Delta v \sqrt{\pi}} \exp\left[-\left(2\sqrt{\ln 2} \frac{v - v_o}{\Delta v}\right)^2\right] \quad (12)$$

where $\Delta v$ is the full width-at-half-maximum bandwidth, then Equation (8) can be evaluated analytically, giving:

$$I_r(\delta_r) = K_s K_r I_o \left[ 1 + \cos(\theta_r)\exp\left[-\left(\frac{\pi \Delta v}{2\sqrt{\ln 2}}\frac{\delta_r}{c}\right)^2\right]\cos\left(2\pi v_o \frac{\delta_r}{c}\right) + \quad (13)$$

-continued $$\frac{1}{2}\cos(\theta_r - \theta_s)\exp\left[-\left(\frac{\pi\Delta v}{2\sqrt{\ln 2}}\frac{\delta_r - \delta_s}{c}\right)^2\right]\cos\left(2\pi v_o \frac{\delta_r - \delta_s}{c}\right)\right]$$

Figure 6:
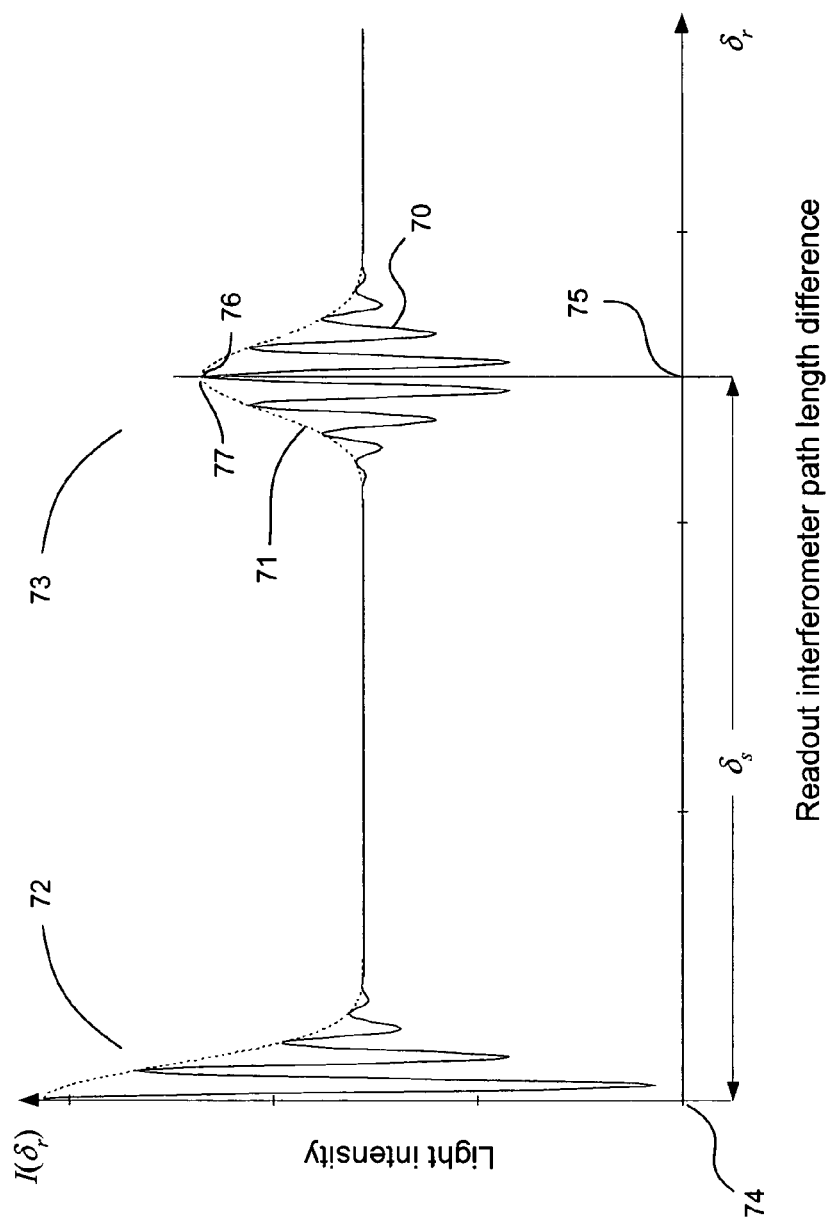
FIG. 6 is an interferogram obtained at the output of optical sensor of FIG. 1 or FIG. 2, when used with an effective light source having a Gaussian-shaped power spectral density.

FIG. 6 show a typical interferogram obtained at the output of the readout interferometer 12 with an effective light source having a Gaussian-shaped power spectral density. The solid curve 70 represents the measured fringes while the dashed curves 71 represent the envelope of the fringes which, obviously, is not a directly observable signal. The interferogram shows two fringe packets: a first one, named hereinafter the zero fringe packet 72, peaked at a position 74 where the path length difference of the readout interferometer is equal to zero and a second one, named hereinafter the measurand fringe packet 73, peaked at a position 75 where the path length difference of the readout interferometer 12 is equal to the one of the sensing interferometer 10, i.e. $\delta_r = \delta_s$. For the following analysis, only the measurand fringe packet will be retained as it is the one of interest for the sensing application. Since the normalized power spectral density P(v) is a real function, Equations (7) and (9) with the Fourier transform properties show that the envelope function $|\gamma_{12}|$ is symmetric about $\delta_r = \delta_s$ and $\alpha_{12}(0)$ is equal to zero. Therefore the fringes are centered with their envelope so either the position of the fringe peak 76 or that of the envelope peak 77 of that fringe packet provide an unambiguous value of the path length difference of the sensing interferometer and so on the value of the measurand. However, it is noted that, compared to the fringe function, the envelope is a slowly varying function of the path length difference and therefore the fringe peak location is generally a more sensitive detection method than the envelope peak method.

Figure 7:
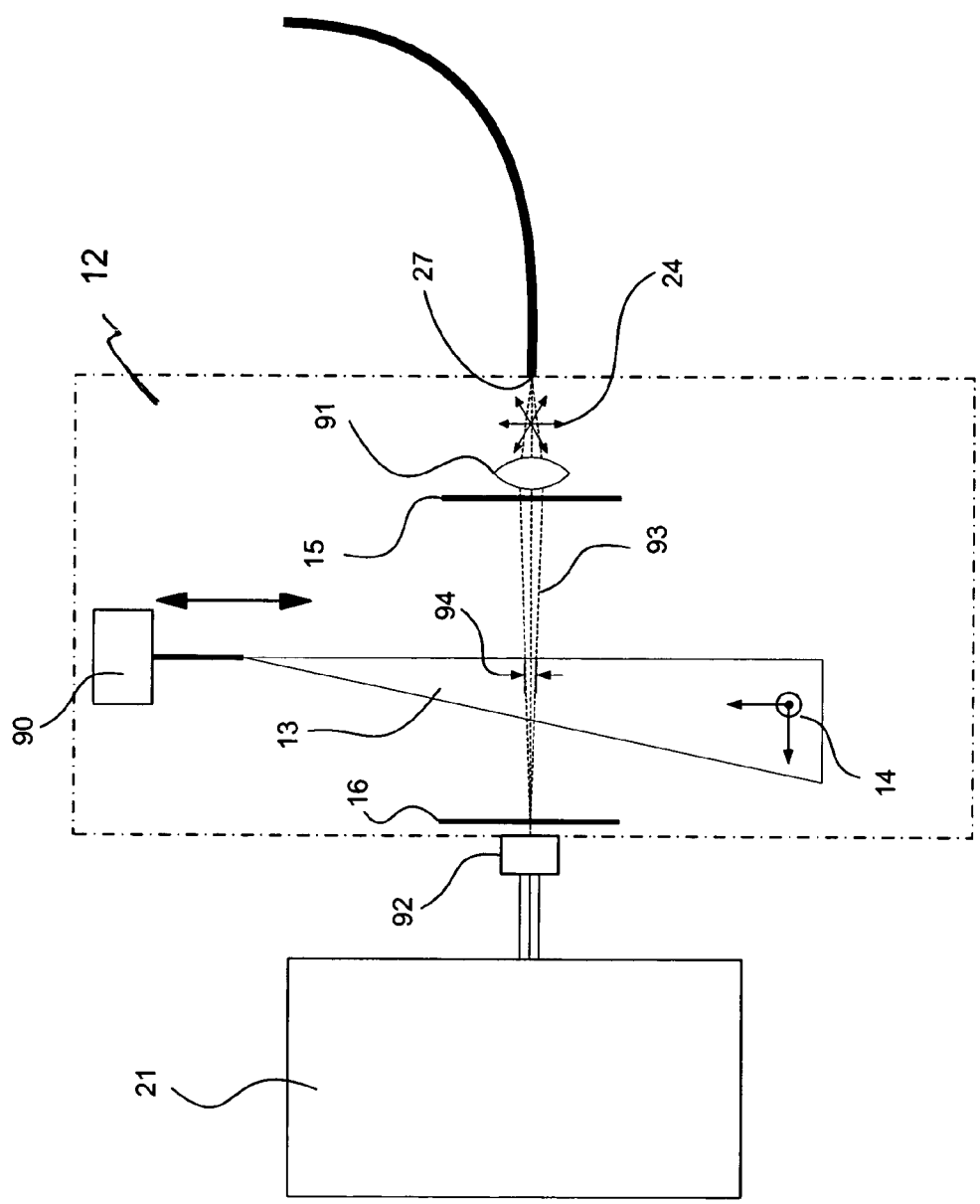
FIG. 7 is a schematic view of a readout interferometer in accordance with another embodiment.

FIG. 7 shows another embodiment for the readout interferometer 12. A scanning mechanism 90 moves the birefringent wedge 13 in a direction transverse to the light beam 93. As the wedge 13 is displaced in front of the beam 93, the light intensity is recorded by a single optical detector 92. Using appropriate focusing optics 91, the transverse size 94 of the light beam 93 at the wedge position can be made small enough so the path length difference of the readout interferometer 12 does not vary significantly over the size of the beam. With this scanning polarization readout interferometer 12, the interferogram is formed in the time domain rather than in the spatial domain. Since mechanical scanning does not provide high temporal resolution, such scanning interferometer is generally restricted to static or quasi-static measurement applications. However, it has distinct advantages, including others, a higher optical throughput and the fact that optical detection can be designed around the 1300 nm or 1550 nm wavelength regions used in fiber-optic telecommunication and benefits from the low absorption of the optical fibers and the low dispersion of the birefringent materials in these spectral regions. It is known that photodetector arrays for the 1300 or 1550 nm wavelength region are still price prohibitive for making cost-effective optical sensors solution for industrial applications. On the other hand, single detectors, in addition to light sources and optical components developed for the fiber-optic telecommunication industry, are readily available at a relatively low cost. Another comparative advantage with respect to the well-known scanning Michelson interferometer, this scanning polarization readout interferometer 12 does not requires a high precision scanning mechanism as it can be seen from equation (3).

Referring back to FIG. 4, the photodetector array 19 is positioned in a direction parallel to the x axis so each pixel or photodiode of the array corresponds to a known x position value. The path length difference $\delta_r$ of the readout interferometer is calibrated for a set of x position values on the x axis. The calibration can be done using different methods, such as, but not limited to, well-known spectrophotometric transmission technique or with a scannable reference interferometer. The electrical signal from the photodetector array is acquired at an adjustable read-out rate. Each scan of the array provides an electrical signal representative of the spatially distributed measurand interferogram signal as given by the last term of Equation (8). This electrical signal is digitally sampled by the signal processor unit 21 which seeks for the x position of the fringe peak or that of the envelope peak of the interferogram signal. Once this x position is resolved, the signal processing unit 21 calculates, by using the readout interferometer calibration data, the corresponding path length difference of the readout interferometer 12 and hence that of the sensing interferometer 10. Thereafter this value is translated into measurand value using the calibration data of the sensing interferometer. It is obvious that similar approaches can be applied for the scanning polarization readout interferometer 12 design of FIG. 7, therefore the following discussions will be restricted to the static interferometer design.

One of the most important tasks of the signal processing unit is to accurately retrieve the x position of the fringe peak or that of the envelope peak of the measurand interferogram signal received from the photodetector array 19. The fixed pattern noise inherent to any static interferometer is removed from the sampled interferogram signal by a proper baseline correction. The fixed pattern noise is mainly determined by the cleanliness of the optical components, particularly the birefringent wedge 13, and by the non-uniformity sensitivity of the individual photodiodes of the photodetector array 19. Then such baseline-corrected signal is digitally filtered in the spatial domain or in the frequency domain to reduce residual artefacts and dynamic noise in the baseline-corrected signal. The zero and low frequency component of the baseline-corrected signal are also removed. The remaining signal hereinafter called the corrected interferogram signal $I_{corr}$ represents the oscillatory components of the interferogram and therefore we have $$I_{corr}(\delta_r) \propto \text{Re}\{\gamma_{12}(\delta_r - \delta_s)\} = \qquad (14)$$
$$|\gamma_{12}(\delta_r - \delta_s)|\cos\left[2\pi v_o\left(\frac{\delta_r - \delta_s}{c}\right) - \alpha_{12}(\delta_r - \delta_s)\right]$$

This signal, representative of the measurand fringe packet 73 signal of FIG. 6 less its DC component, has to be further processed to extract the x position value of the fringe peak or that of the envelope peak value. First a simple peak-finding search routine is performed to locate the fringe peak. Then a polynomial least-square fit is performed around the fringe peak to precisely determine the fringe peak location. This method has the advantage to be very simple to implement and does not require significant computing power from the signal processing unit.

While in theory the envelope peak method offers less resolution than the fringe peak method, it may be advantageous in some conditions to locate the envelope peak instead of the fringe peak. For that purpose, the envelope function has to be extracted from the corrected interferogram signal and those familiar with communication signals may recognize the similitudes between the features of the corrected interferogram signal and those found in amplitude-modulated communication signals. Therefore, well-known amplitude demodulation techniques by envelope detection can be easily implemented using digital signal processing methods. It is an object of this invention to provide means to locate the envelope peak of the measurand fringe packet. First the envelope function is extracted from the corrected interferogram signal using, for example, the Hilbert transform method or the squaring, low-pass filtering method, either in the spatial domain or in the frequency domain. Then a polynomial least-square fit is performed around the envelope peak to precisely determine the envelope peak location. Such digital signal processing methods require that the interferogram signal being sampled at the Nyquist rate or above. Nowadays high density photodetector linear array are of common usage so this requirement is easily met in practice.

Figure 8:
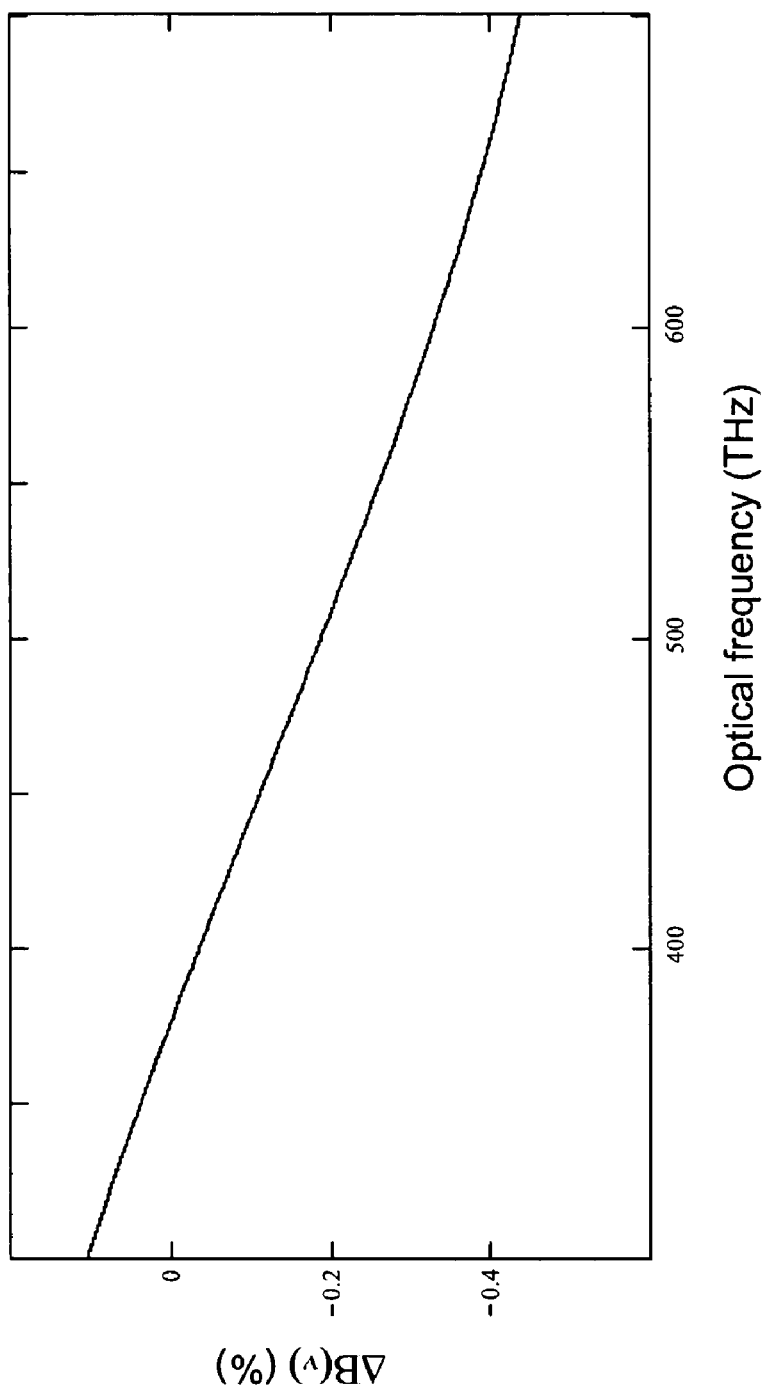
FIG. 8 is a graph of the normalized differential birefringence dispersion curve of an optical sensor in accordance with an embodiment of the present invention.

When the sensing (and/or the readout) interferometer contains dispersive media, the path length difference is no longer constant with respect to the frequency. High order dispersion can produce significant and asymmetrical broadening of the interferogram envelope, diminution of fringe visibility and additional phase shift between the envelope and the fringes. If not properly corrected, these spurious effects can severally reduce the accuracy of the fringe peak or the envelope peak detection methods. It has been suggested in the prior art to use a readout interferometer 12 made of the same material as the sensing interferometer 10. However, as we mentioned earlier, this configuration is not desirable. A much better configuration, is to use a birefringent material that has similar dispersion terms (i.e. linear and higher order dispersion terms) as those of the sensing interferometer 10 but without its measurand sensitivity. In the case of polarization sensing and readout interferometers, there are pairs of birefringent crystals that have similar dispersion but one of the crystals has a low measurand sensitivity. It is therefore an object of this invention to provide a dispersion compensation method based on dispersion properties of the readout and sensing interferometer. For example, the $MgF_2$ crystal of the readout interferometer can be paired with the Lithium Triborate ($LiB_3O_5$) crystal. This biaxial crystal can be used as a polarization temperature sensing interferometer. Its temperature coefficient compares very well with other crystals used for that purpose in the prior art (see Table 1). With the convention $n_z > n_y > n_x$ for the principal indices of the birefringent crystal, the birefringence of the $LiB_3O_5$ crystal for the x-cut orientation, (i.e. the y and z principal vibration axes are parallel to the surface of the crystal plate) is therefore $B \equiv (n_z - n_y)$. With such orientation, the birefringence dispersion terms of this crystal are similar to those of the $MgF_2$ crystal. This is best appreciated by plotting the curve of the difference of the birefringence dispersion terms between these two crystals. FIG. 8 shows the normalized differential birefringence dispersion curve $\Delta B$ in the frequency range of interest for the $MgF_2$ ($B_r$) and $LiB_3O_5$ x-cut ($B_s$) crystal pair. $\Delta B$ is defined as follow:

$$\Delta B(v) = 2\frac{(B_r(v) - B_r(v_o)) - (B_s(v) - B_s(v_o))}{B_r(v_o) + B_s(v_o)} \quad (15)$$

where $B(v)$ represents the frequency dependent birefringence function of the readout (subscript r) and the sensing (subscript s) interferometer It can be seen that $\Delta B$ varies by less than 0.5% over the frequency range of interest. Such a small variation does not produce any significant change to the interferogram signal.

Figure 9:
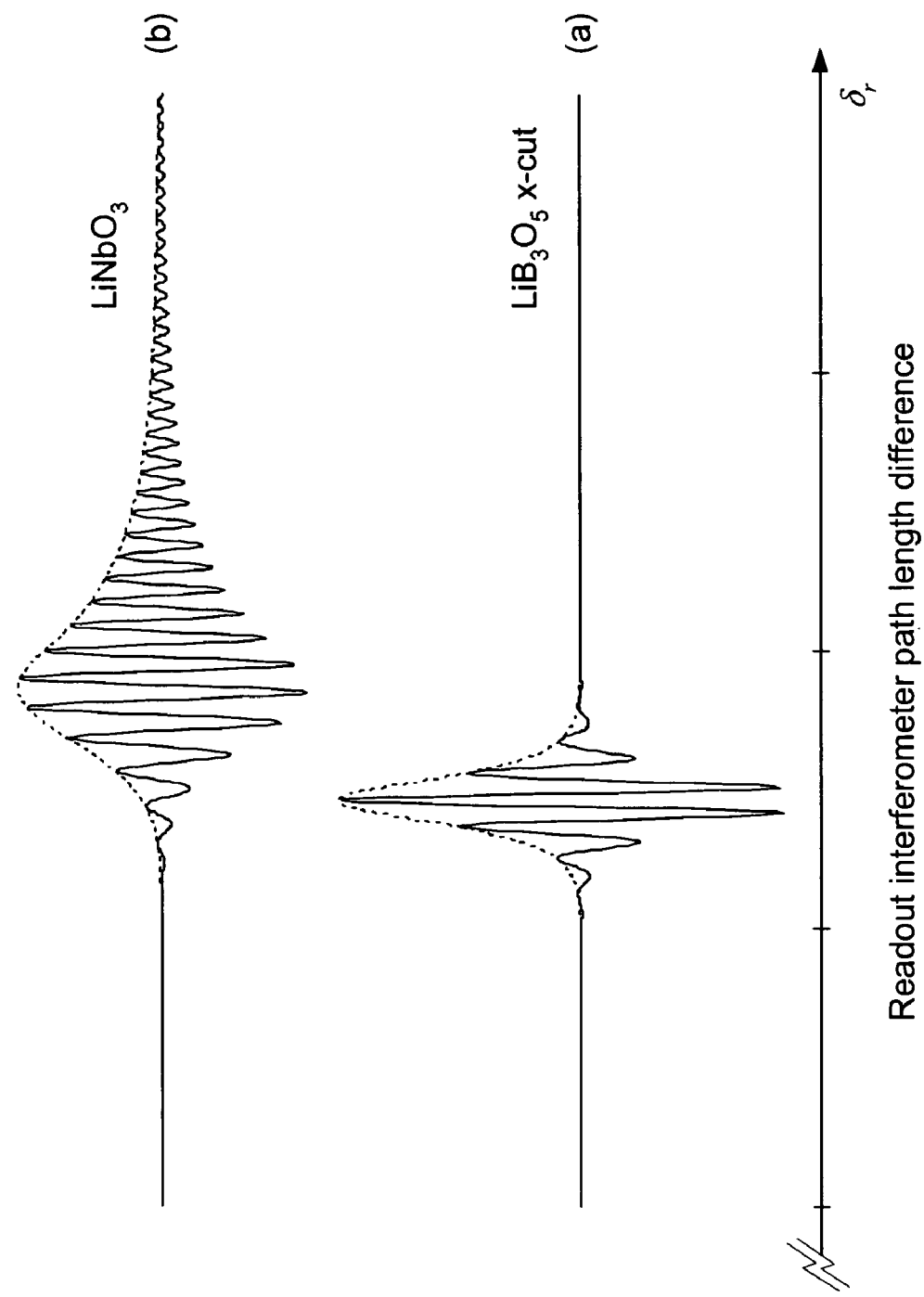
FIG. 9, curve (a), is a graph of the interferogram obtained with a polarization readout interferometer made of $MgF_2$ crystal wedge and with a polarization sensing interferometer made of a $LiB_3O_5$ x-cut crystal plate, in accordance with an embodiment of the present invention.

FIG. 9 shows the measurand interferogram signal curve (curve (a)) obtained with a polarization readout interferometer made of $MgF_2$ crystal wedge and with a polarization sensing interferometer made of a $LiB_3O_5$ x-cut crystal plate. Curve (b) is the measurand interferogram signal curve obtained with the same readout interferometer but with the $LiNbO_3$ crystal used in prior art. Not show on FIG. 9 is the fact that the fringe peak of the $LiB_3O_5$ x-cut crystal remains fairly in the same position as that of the envelope peak while the path length difference of the sensing interferometer varies. On the other hand, with the $LiNbO_3$ crystal the fringes appear to move within the envelope while the path length difference of the sensing interferometer varies. It can also be seen that the envelope in this case is broader and that the contrast is lower. It is evident that the $LiB_3O_5$ x-cut crystal is a better choice. It is another object of this invention to provide a polarization temperature sensing interferometer based on $LiB_3O_5$ x-cut crystal. Various reflective and transmissive configurations of this interferometer can be made such as those described in the Mariller and Lequime document and they are not given here as they are evident for those skilled in the art.

Although the present invention has been described hereinabove by way of specific embodiments thereof, it can be modified, without departing from the spirit and nature of the subject invention as defined herein. The scope of the invention is therefore intended to be limited solely by the scope of the appended claims.

I claim:

1. A tandem interferometer optical sensor system, based on low-coherence interferometry, for measuring a physical quantity, the system comprising:
    a light system generating a light intensity characterized by a coherence length;
    a sensing interferometer, having a sensor path length difference larger than said coherence length, for receiving the light intensity and generating a sensor light signal as a function of said sensor path length difference, wherein said sensor path length difference is modifiable by a variation of the physical quantity; and
    a polarization readout interferometer, having a readout path length difference and based on two-beam interferometer configuration, receiving the sensor light signal and generating, at an output location and as a function of said readout path length difference, a readout light signal, said polarization readout interferometer comprising an input polarizer for decomposing the sensor light signal into two linear orthogonal polarization components, a single birefringent wedge in which are propagating at different speeds said polarization components, an output polarizer for recombining after propagation in the wedge the polarization components, and a focusing optic arrangement for relaying the received sensor light signal through the input polarizer, the birefringent wedge and the output polarizer and towards said output location, to thereby provide the readout light signal as a function of the readout path length difference.

2. The tandem interferometer optical sensor system of claim 1, wherein said sensor path length difference comprises a trajectory in a first birefringent material and said birefringent wedge is made of a second birefringent material different from said first birefrinqent material, and wherein said first and second birefringent materials have similar dispersion properties, to thereby provide a dispersion-compensated optical sensor system.

3. The tandem interferometer optical sensor system of claim 2, wherein said first birefringent material comprises $L_iB_3O_5$ with x-cut orientation and the second birefringent material comprises $M_gF_2$.

4. The tandem interferometer optical sensor system of claim 1, wherein said readout path length difference of the polarization readout interferometer comprises a readout path length difference that varies spatially as a function of a readout axis.

5. The tandem interferometer optical sensor system of claim 4, wherein said readout light signal comprises a spatially distributed signal along said readout axis and wherein the detection location is spatially distributed along said readout axis, to thereby provide a distributed interferogram at the detection location.

6. The tandem interferometer optical sensor system of claim 5, wherein said focusing optic arrangement comprises one of a cylindrical lens and a cylindrical mirror for focusing along said readout axis said distributed interferogram.

7. The tandem interferometer optical sensor system of claim 5, further comprising an optical fiber to relay the sensor light signal from the sensing interferometer to the polarization readout interferometer.

8. The tandem interferometer optical sensor system of claim 7, further comprising an optical fiber to relay the light intensity from the light system to the sensing interferometer.

9. The tandem interferometer optical sensor system of claim 5, wherein said sensor path length difference comprises a trajectory in a first birefringent material and said birefringent wedge is made of a second birefringent material, and wherein said first and second birefringent materials have similar dispersion properties, to thereby provide a dispersion-compensated optical sensor system.

10. The tandem interferometer optical sensor system of claim 9, wherein said first birefringent material comprises $L_iB_3O_5$ with x-cut orientation and the second birefringent material comprises $M_gF_2$.

11. The tandem interferometer optical sensor system of claim 5, further comprising a photodetector array positioned at the detection location, for receiving said distributed interferogram and generating a corresponding photodetector signal as a function of the readout path length difference.

12. The tandem interferometer optical sensor system of claim 11, further comprising a signal processing unit for determining the physical quantity from the photodetector signal, thereby providing a static optical sensor system for the measurement of said physical quantity.

13. The tandem interferometer optical sensor system of claim 12, wherein said signal processing unit comprises an embedded software for determining a maximum of the distributed interferogram, to thereby obtain from the readout path length difference corresponding to this maximum said physical quantity.

14. The tandem interferometer optical sensor system of claim 13, wherein said embedded software comprises a calibration database in which is stored a relation between a series of values of said physical quantity and their corresponding sensor path length difference.

15. The tandem interferometer optical sensor system of claim 14, wherein said sensor path length difference comprises a trajectory in a first birefringent material and said birefringent wedge is made of a second birefringent material, and wherein said first and second birefringent materials have similar dispersion properties, to thereby provide a dispersion-compensated static optical sensor system.

16. The tandem interferometer optical sensor system of claim 15, wherein said first birefringent material comprises $L_iB_3O_5$ with x-cut orientation and the second birefringent material comprises $M_gF_2$.

17. The tandem interferometer optical sensor system of claim 1, wherein said polarization readout interferometer comprises a scanning polarization readout interferometer whereby said readout path length difference is scanned to therefore provide a scanned readout light signal at said detection location that varies with said scanned readout path length difference.

18. The tandem interferometer optical sensor system of claim 17, wherein said sensor path length difference comprises a trajectory in a first birefringent material and said birefringent wedge is made of a second birefringent material, and wherein said first and second birefringent materials have similar dispersion properties, to thereby provide a dispersion-compensated optical sensor system.

19. The tandem interferometer optical sensor system of claim 18, wherein said first birefringent material comprises $L_iB_3O_5$ with x-cut orientation and the second birefringent material comprises $M_gF_2$.

20. The tandem interferometer optical sensor system of claim 17, further comprising displacement means for scanning said birefringent wedge.

21. The tandem interferometer optical sensor system of claim 20, further comprising a single photodetector positioned at the detection location, for receiving said scanned readout light signal and generating a corresponding photodetector signal, wherein said photodetector signal is a varying signal corresponding to the scanned readout path length difference.

22. The tandem interferometer optical sensor system of claim 21, wherein said focusing optic arrangement comprises one of a lens and a mirror for focusing on said single photodetector said scanned readout light signal.

23. The tandem interferometer optical sensor system of claim 21, further comprising an optical fiber to relay the sensor light signal from the sensing interferometer to the polarization readout interferometer.

24. The tandem interferometer optical sensor system of claim 23, further comprising an optical fiber to relay the light intensity from the light system to the sensing interferometer.

25. The tandem interferometer optical sensor system of claim 21, further comprising a signal processing unit for determining the physical quantity from the varying photodetector signal, thereby providing a scanning optical sensor system for the measurement of said physical quantity.

26. The tandem interferometer optical sensor system of claim 25, wherein said signal processing unit comprises an embedded software for determining a maximum of the varying of the photodetector signal, to thereby obtain from the readout path length difference corresponding to this maximum said physical quantity.

27. The tandem interferometer optical sensor system of claim 26, wherein said embedded software comprises a calibration database in which is stored a relation between a series of values of said physical quantity and their corresponding sensor path length difference.

28. The tandem interferometer optical sensor system of claim 27, wherein said sensor path length difference comprises a trajectory in a first birefringent material and said birefringent wedge is made of a second birefringent material, and wherein said first and second birefringent materials have similar dispersion properties, to thereby provide a dispersion-compensated scanning optical sensor system.

29. The tandem interferometer optical sensor system of claim 2, wherein said first birefringent material comprises $L_iB_3O_5$ with x-cut orientation and the second birefringent material comprises $M_gF_2$.

30. A method, based on low-coherence interferometry, for measuring a physical quantity, the method comprising:
providing a light system for generating a light intensity characterized by a coherence length;
providing a sensing interferometer, having a sensor path length difference that is sensitive to the physical quantity such as to be modified by a variation of the physical quantity and that is larger than said coherence length;
providing a polarization readout interferometer, having a readout path length difference and based on two-beam interferometer configuration, said polarization readout interferometer comprising an input polarizer for decomposing into two linear orthogonal polarization components a light, a single birefringent wedge in which are propagating at different speed said polarization components, an output polarizer for recombining after propagation in the wedge the polarization components and a focusing optic arrangement;
providing, at a detection location, a photodetector;
relaying the light intensity from the light system into the sensing interferometer, wherein said sensing interferometer generates a sensor light signal as a function of its sensor path length difference;
relaying said sensor light signal, using said focusing optic arrangement, through the input polarizer, the birefringent wedge and the output polarizer and towards said output location and generating, at said detection location by recombination of said polarization components, a readout light signal as a function of said readout path length difference;
detecting, with said photodetector, said readout light signal; and
generating a photodetector signal corresoonding to the detected readout light signal, as a function of the readout path length difference for determining the physical quantity by analyzing the photodetector signal as a function of the readout path length difference.

31. The method as claimed in claim 30, further comprising providing a calibration database that links said sensor path length difference to said physical quantity.

32. The method as claimed in claim 31, wherein said providing a sensing interferometer comprises providing in said sensor path length difference a trajectory in a first birefringent material and wherein said providing a polarization readout interferometer comprises providing a birefringent wedge made of a second birefringent material, and further comprises selecting said first and second birefringent materials such that they have similar dispersion properties, said first and second birefringent materials being different, to thereby provide a dispersion-compensated optical sensor system.

33. The method as claimed in claim 32, wherein said relaying said sensor light signal comprises distributing said sensor light signal along the birefringent wedge such as to produce, as a readout light signal, a spatially distributed nterferogram.

34. A dispersion-compensated tandem interferometer, sensitive to a temperature, the interferometer comprising:
a sensing interferometer having a $L_iB_3O_5$ crystal with an x-cut orientation and a $L_iB_3O_5$ birefringence dispersion, said sensing interferometer having a sensor path length difference that comprises a trajectory in said $L_iB_3O_5$ crystal, whereby the path length difference is sensitive to the temperature such as to be modified by a variation of the temperature; and
a readout interferometer optically coupled to said sensing interferometer and having a $M_gF_2$ crystal with a $M_gF_2$ birefringence dispersion, said readout interferometer havin a readout path length difference that comprises a trajectory in said $M_gF_2$ crystal, whereby said $M_gF_2$ birefringence dispersion at least partially compensate said $L_iB_3O_5$ birefringence dispersion.

35. A polarization interferometer, having a path length difference, for providing, upon receiving an input light, an output signal, the polarization interferometer comprising:
an input polarizer for decomposing said input light into two linear orthogonal polarization components;
a single birefringent wedge in which are propagating at different speeds said polarization components;
an output polarizer for recombining, after propagation in the wedge, the polarization components; and
a focusing optic arrangement for relaying the input light through the input polarizer, the single birefringent wedge and the output polarizer and towards an output location,
whereby said interferometer, upon receiving said input light, provides, at the output location, said output signal as a function of the path length difference.

36. The polarization interferometer of claim 35, wherein said single birefringent wedge comprises a $M_gF_2$ crystal.

37. The polarization interferometer of claim 36, wherein said path length difference comprises a path length difference that varies spatially as a function of a readout axis and wherein said output signal comprises a spatially distributed signal along said readout axis and further wherein the output location is spatially distributed along said readout axis, to thereby provide a distributed interferogram at the output location.

38. The polarization interferometer of claim 36, further comprising means for scanning said single birefringent wedge in respect to said input light and to thereby scan the path length difference, to therefore provide a scanned output signal at said detection location that varies with said scanned path length difference.

39. A method for minimizing a dispersion effect on a measurement of a physical quantity made using an interferogram produced by an low-coherence interferometry-based tandem interferometer optical system, the method comprising: selecting a first birefringent material sensitive to the physical quantity and having a first dispersion, and a second birefringent material different from said first birefringent material and having a second dispersion, a value of said first dispersion to be similar to a value of said second dispersion;
providing a sensing component made of said first birefringent material;
providing a birefringent wedge made of said second birefringent material; and
producing said optical system having a sensing interferometer comprising said sensing component for providing a path length difference modifiable by a variation of said physical quantity, and a polarization readout interferometer optically coupled to said sensing interferometer and having a single one of said birefringent wedge, said polarization readout interferometer having a readout path length difference and being based on two-beam interferometer configuration, for providing a spatially distributed interferogram.

* * * * *

UNITED STATES PATENT AND TRADEMARK OFFICE
CERTIFICATE OF CORRECTION

PATENT NO. : 7,259,862 B2  Page 1 of 1
APPLICATION NO. : 10/976863
DATED : August 21, 2007
INVENTOR(S) : Gaétan Duplain It is certified that error appears in the above-identified patent and that said Letters Patent is hereby corrected as shown below:

Column 17, line 26: "interterometer" should be changed to --interferometer--.
            line 50: "interterometer" should be changed to --interferometer--.
Column 18, line 5: "interterometer" should be changed to --interferometer--.
            line 7: "interferorneter" should be changed to --interferometer--.
Column 19, line 25: "interterometer" should be changed to --interferometer--.
            line 37: "corresoonding" should be changed to --corresponding--.
            line 60: "nterferogram" should be changed to --interferogram--.

Signed and Sealed this

Twenty-ninth Day of July, 2008

JON W. DUDAS
*Director of the United States Patent and Trademark Office*